(12) United States Patent
Saunders

(10) Patent No.: US 6,349,195 B1
(45) Date of Patent: Feb. 19, 2002

(54) SUPPLEMENTAL SATELLITE COMMUNICATION ENHANCEMENT TECHNIQUES

(75) Inventor: Oliver W. Saunders, Los Angeles, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/262,418

(22) Filed: Mar. 4, 1999

(51) Int. Cl.$^7$ ................................................ H04Q 7/06
(52) U.S. Cl. ..................................... 455/12.1; 455/427
(58) Field of Search .............................. 455/12.1, 13.1, 455/13.2, 13.3, 427, 430; 370/316; 244/159, 158 R

(56) References Cited

U.S. PATENT DOCUMENTS

| | | | |
|---|---|---|---|
| 5,666,648 A | * 9/1997 | Stuart | 370/321 |
| 5,722,042 A | * 2/1998 | Kimura et al. | 455/13.1 |
| 5,845,206 A | * 12/1998 | Castiel et al. | 455/13.4 |
| 5,884,142 A | * 3/1999 | Wiedeman et al. | 455/12.1 |
| 5,911,389 A | * 6/1999 | Drake | 244/158 |
| 5,915,217 A | * 6/1999 | Wiedeman et al. | 455/427 |
| 5,957,409 A | * 9/1999 | Castiel et al. | 244/158 R |
| 6,007,027 A | * 12/1999 | Diekelman et al. | 244/158 R |
| 6,128,286 A | * 10/2000 | Leopold et al. | 370/316 |
| 6,167,028 A | * 12/2000 | Harris | 370/230 |

* cited by examiner

Primary Examiner—William Trost
Assistant Examiner—Congvan Tran
(74) Attorney, Agent, or Firm—McAndrews, Held & Malloy, Ltd.

(57) ABSTRACT

Apparatus for enhancing the communication capabilities of a satellite communication system including an uplink receiver 40 deployable with a first satellite 20 and capable of receiving signals from a ground-based communication station 30. A first processor 50 deployable on satellite 20 is capable of processing signals from uplink receiver 40. A two-way link terminal 60 deployable with satellite 20 is capable of communication with a second two-way intersatellite communication link terminal 220 deployable with a second satellite 200. A first switch 100 deployable with satellite 20 enables signals from uplink receiver 40 to be utilized by communication link terminal 60 or processor 50. A downlink transmitter 80 deployable with satellite 20 is capable of transmitting signals to a ground-based communication station 90. A second switch 110 deployable with satellite 20 enables signals from communication link terminal 60 or first processor 50 to be utilized by downlink transmitter 80.

18 Claims, 2 Drawing Sheets

SUPPLEMENTAL SATELLITE COMMUNICATION ENHANCEMENT TECHNIQUES

BACKGROUND OF THE INVENTION

This invention relates to enhancing the communication capabilities of a core satellite communication system, and more particularly relates to such a system in which supplemental communications can be performed aboard a supplemental satellite launched after the core satellite.

The long operational lifetimes of orbiting communication satellites or spacecraft present a dilemma for designers of the communication systems included in such spacecraft. Large, high capacity spacecraft with provisions for currently-required ground to satellite network connectivity are expensive, and their associated launch costs are substantial. As a result, there is a tendency to procure the largest, longest lifetime spacecraft possible.

However, deploying spacecraft with the longest lifetime possible presents problems in the context of the present communications industry which is changing rapidly and which is expected to serve new markets, possibly requiring direct connectivity between satellites, in the future. However, the details of the new markets and services are not clear and have not been defined. With spacecraft communications in such a state of flux, some consultants have publicly advised against deploying spacecraft with operational lifetimes longer than about five years.

The current preference in commercial spacecraft is for stand-alone spacecraft with interconnection through ground terminals that have simultaneous visibility to multiple satellites (i.e., multi-hop, ground bounce). It is widely accepted that high capacity inter-satellite links will eventually become cost effective in satellite communications networks, but current economics weigh against their deployment at this time. There is a need for an approach that allows deployment of large, expensive spacecraft optimized for current network operations whose connectivity can be expanded at a future time to include long range intersatellite links.

Communication satellites are generally deployed in a defined orbital slot which consists of a geographical location and a band of frequencies which are authorized for receipt and transmission of communication signals. The acquisition of an orbital slot requires substantial effort and expense. There is a need for communication circuit techniques which enable the investment in an orbital slot to be protected by changing the communication functionability of an initial core spacecraft which is assigned to the orbital slot.

There also is a need for techniques which permit a spacecraft's communication processing to be altered functionally, possibly multiple times, during its operational lifetime and which allows for direct intersatellite communications in the future. The present invention enables the communication functionality to be altered and to allow intersatellite communications to be added with a degree of economy and ease which is not available by using any of the known prior techniques.

BRIEF SUMMARY OF THE INVENTION

One object of the present invention is to provide components which can be placed on a core or initial satellite and which enable and facilitate long distance intersatellite communication after the core satellite is placed into an orbital slot.

Another object of the invention is to provide components suitable for launching on a core satellite which perform ground to satellite communications immediately upon deployment, but which facilitate communication with additional components launchable with a less expensive supplemental satellite that enable direct long distance inter-satellite communication in the future.

Yet another object of the present invention is to provide components suitable for launching with a core satellite to allow communication with a supplemental satellite on which new long distance intersatellite communication can be carried out, but which does not require duplication of the uplinks and downlinks built into the core satellite.

By using a component arrangement of the foregoing type, communication signals received by the core satellite may be routed to a supplemental satellite over an intersatellite short range link where they can be used to communicate with another satellite via a long range intersatellite link. Communication signals received from another satellite over the long range link may be sent back to the core satellite over the short range intersatellite link and inserted into a downlink signal chain for downlink transmission.

In one embodiment of the invention, there is an uplink receiver which is deployable with a first satellite and which is capable of receiving communication signals from a first ground based communication station. A first processor, such as a bent pipe repeater, is deployable on the first satellite and is capable of processing signals from the uplink receiver. A two-way intersatellite communications link terminal, deployable with the first satellite and operable within a first range, is capable of communication with a second two-way communication link terminal deployable with the second satellite which is capable of receiving intersatellite signals from beyond the first range. A first switch, deployable with the first satellite, enables signals from the uplink receiver to be utilized by the first intersatellite communication link terminal or the first processor. A downlink transmitter, deployable with the first satellite, is capable of transmitting signals to a second ground based communication station. A second switch, deployable with the first satellite, enables signals from the first intersatellite link terminal or the first processor to be utilized by the downlink transmitter.

By employing apparatus of the foregoing type, the communication capabilities of the first satellite can be enhanced by launching the second satellite, preferably into the orbital slot of the first satellite. Long range intersatellite communications can be performed on the second satellite and communicated to the ground through the uplink and downlink transmitters on the first satellite. By using apparatus and methods of the foregoing type, the processing functionality of the satellite communication system can be altered and modified with a degree of ease and economy and not available by the use of the known prior techniques.

The foregoing techniques enable the satellite system operator to defer major decisions about the need to incorporate long range intersatellite links until the need materializes and/or the required technology/protocols have time to mature. A spacecraft can be launched and activated. Then, through the addition of a supplemental satellite, its role in the communications network that it serves can be altered/expanded to meet changing market conditions or operational requirements. In this way, orbital slots can be populated with satellites whose productive lifetime is protected from obsolescence.

BRIEF DESCRIPTION OF THE DRAWINGS

The foregoing advantages and features of the present invention will appear for purposes of illustration, but not of limitation, in connection with the accompanying drawings wherein like numbers refer to like parts throughout, and wherein.

DETAILED DESCRIPTION OF THE INVENTION

Figure 1:
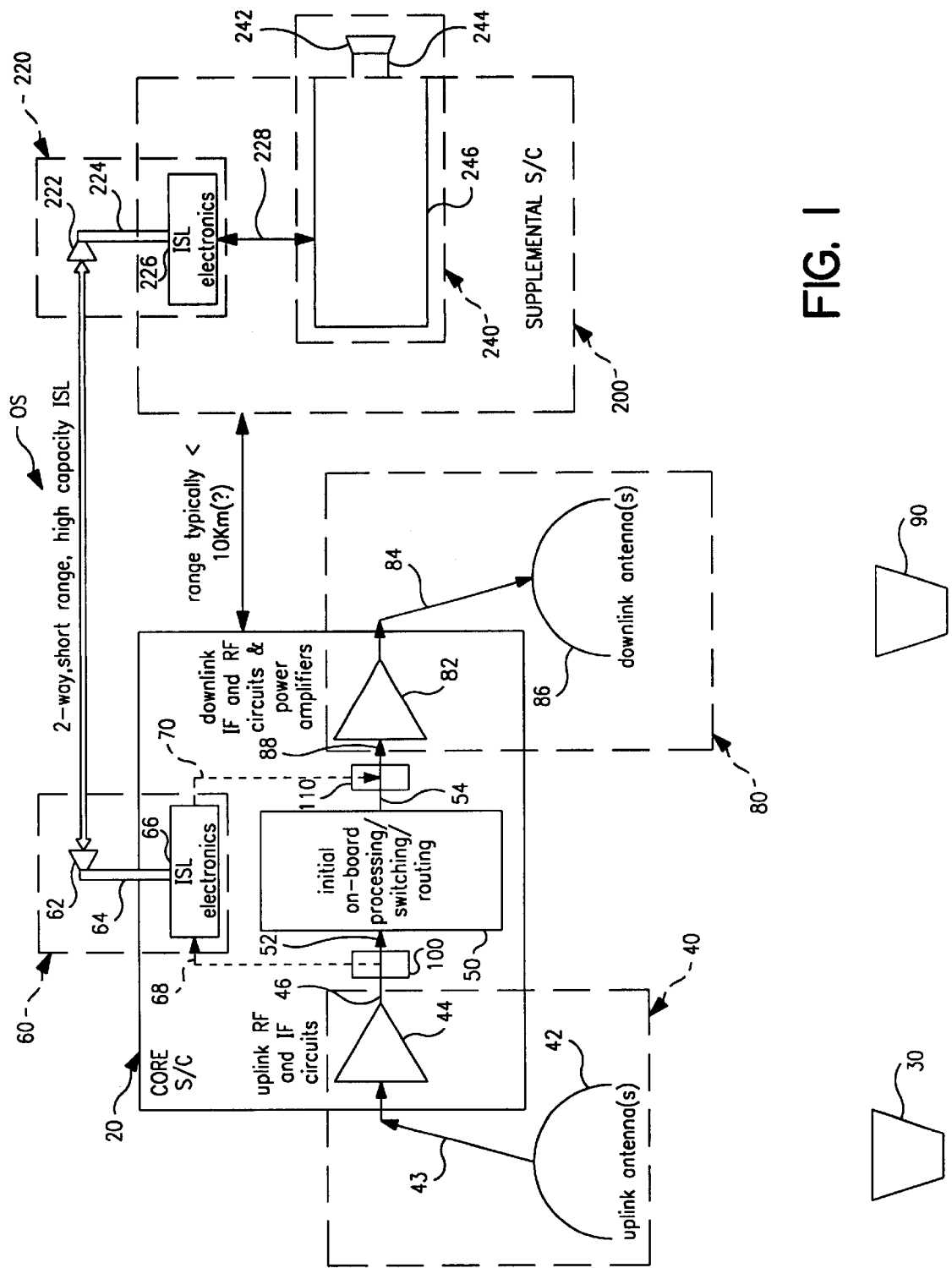
FIG. 1 is a schematic block diagram of a preferred form of satellite communication system embodying the present invention.

Referring to FIG. 1, a preferred form of the invention is deployable on a conventional core satellite 20 suitable for launching into an orbital slot OS. Radio frequency communication signals are transmitted to the satellite 20 from a conventional ground-based communication station 30. The radio signals are received by an uplink receiver 40 having an output 46 and comprising a radio frequency antenna 42 which transmits radio frequency carrier signals over a lead 43 to a conventional converter 44 which converts the radio carrier frequency signals to intermediate frequency (IF) signals.

A processor 50 may be provided on core satellite 20 and connected as shown. The processor may be a conventional repeater transponder also known as a non-regenerative repeater or bent pipe which receives the IF signals from receiver 40 and shifts the frequency to the downlink band. In addition, processor 50 may perform onboard IF switching. Processor 50 has an input 52 and an output 54 arranged as shown.

The preferred form the invention also includes an intersatellite communication link terminal 60 which is suitable for launching on core satellite 20. The terminal includes an antenna 62 which transmits and receives radio frequency signals that are transmitted over a lead 64 to conventional link electronics 66. Terminal 60 has an input 68 and an output 70 arranged as shown. The terminal comprises a conventional two-way, short-range, high-capacity intersatellite link which is known to those skilled in the art and typically is operable over a range of about 10–20 kilometers.

The preferred form of the invention also includes a conventional downlink transmitter 80 suitable for launching on core satellite 20. Transmitter 80 includes a transmitter module 82 which receives IF signals from processor 50, amplifies those signals and transforms them to radio frequency carrier signals suitable for transmission over a lead 84 to a conventional downlink antenna 86. The radio frequency carrier signals from antenna 86 are suitable for transmission to a conventional ground-based communication station 90. Transmitter 80 has an input 88 connected as shown.

The preferred form of the invention also includes a switch 100 deployable on satellite 20 and suitable for switching signals from output 46 to either input 52 of processor 50 or input 68 of link terminal 60. Such switches are well known to those skilled in the art and may take various forms. For example, switch 100 may be arranged as gates which allow signals from receiver 40 to proceed through terminal 60 and/or processor 50. In another form, switch 100 may be gates which apply power to portions of terminal 60 or processor 50 so that signals may be utilized by them. All of these possible forms of switch 100 are means for enabling signals from receiver 40 to be utilized by terminal 60 and/or processor 50.

The preferred form of the invention also includes another switch 110 like switch 100 deployable on core satellite 20 and suitable for switching signals to input 88 of downlink transmitter 80 from output 70 of link terminal 60 or output 54 of processor 50. Switch 110 may take additional forms similar to those described in connection with switch 100. The various forms of switch 110 comprise means for enabling signals from terminal 60 and/or processor 50 to be utilized by terminal 80.

Switches 100 and 110 may initiate switching or gating in response to information carried by signals, such as the signals received by receiver 40 and terminal 60. Such switches are well known.

In this application, signals include various characteristics of signals, such as signal carrier or envelope, and information or data embodied in the signals to be utilized.

The above-described apparatus facilitates the addition of long range intersatellite communications to satellite 20 by use of a supplemental satellite 200 which may be launched into orbital slot OS after satellite 20 is already in that orbital slot. The apparatus deployable on satellite 200 includes a two-way intersatellite communication link terminal 220 which may be identical to terminal link 60. Link terminal 220 includes an antenna 222 which transmits radio frequency signals over a lead 224 to conventional link electronics 226.

Link terminals 60 and 220 communicate with each other over a short range of distance within orbital slot OS which may typically be about 10–20 kilometers.

Satellite 200 also includes a conventional two-way, long-range intersatellite communication link terminal 240 which comprises an antenna 242 which communicates with conventional long-range communication electronics 246 over a lead 244. Communication signals are transmitted between communication electronic circuits 226 and 246 over a cable 228. Terminal 240 may communicate over a long range, such as several thousand kilometers or more.

Figure 2:
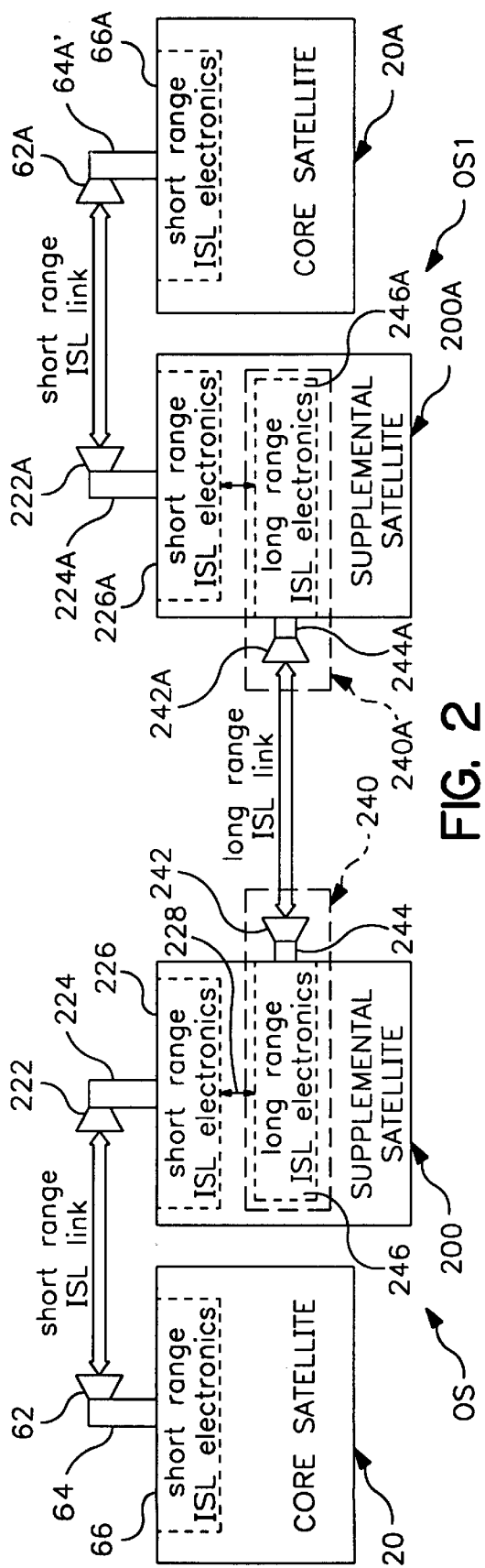
FIG. 2 is a schematic black diagram of one form of the invention by which long range intersatellite communications is carried out using two supplemental satellites.

Referring to FIG. 2, terminal 240 is adapted to communicate with a like terminal 240A located on another supplemental satellite 200A located in an orbital slot OS1 different from slot OS.

Each of the components designated with an A suffix is identical to like-numbered components of satellite 200. Terminal 220A, in turn, is adapted to communicate with a terminal 60A which is identical to terminal 60. Terminal 60A is located on a core satellite 20A also located in orbital slot OS1. Terminals 220A and 60A communicate over a short range of about 10–20 kilometers.

Figure 3:
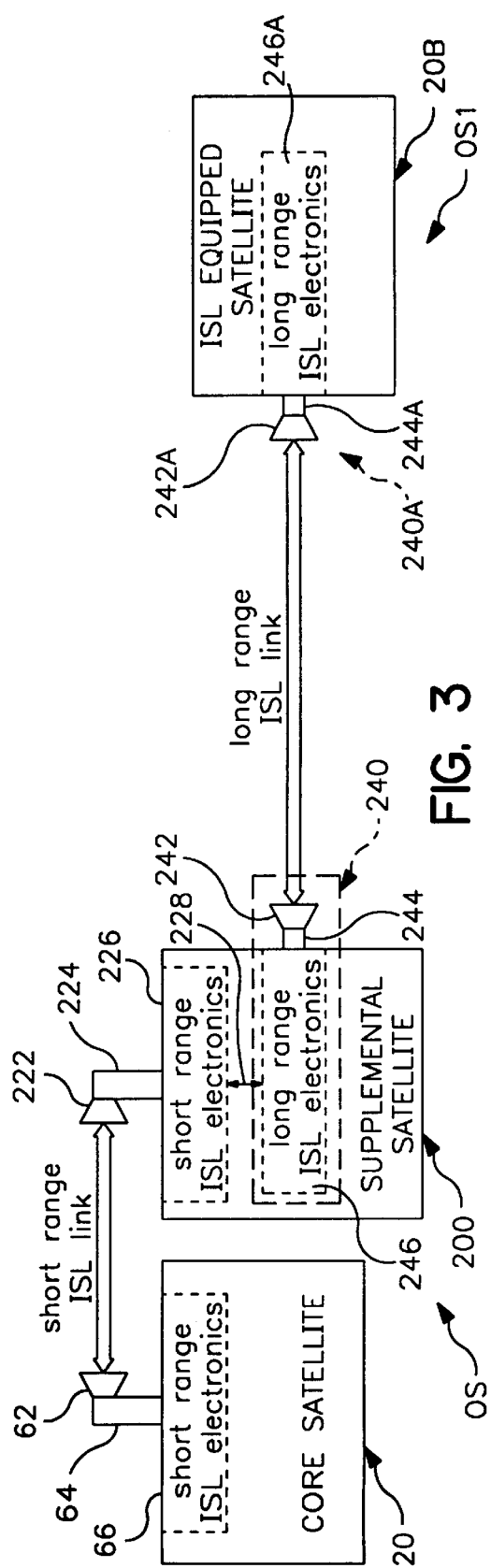
FIG. 3 is a schematic black diagram of another form of the invention by which long range intersatellite communications is carried out using a single supplemental satellite.

Referring to FIG. 3, terminal 240A also may be located on a core satellite 20B launched into orbital slot OS1. Satellites 200 and 20B typically are a long distance apart, such as several thousand kilometers or more.

The preferred embodiment is used by placing the above-described components on core satellite 20 and launching the satellite into orbital slot OS. At some future time, when a sufficient number of satellites has been deployed to provide a basis for a viable satellite network and the need for direct connectivity between the satellites has been validated, supplemental satellite 200 is designed to contain the terminals and processing needed for long-range intersatellite communications. Note that only the new intersatellite communications is incorporated into satellite 200. The uplink receiver 40 and downlink transmitter 80 needed for ground communications remain on core satellite 20 and are not needed in supplemental satellite 200. Supplemental satellite 200 is positioned in orbital slot OS near core satellite 20 and communicates with the core satellite via link terminal 60 and link terminal 220.

If satellite 20A (FIG. 2) is already in orbital slot OS1, long range intersatellite communications between satellites 20 and 20A can be established by launching satellite 200 into orbital slot OS and launching satellite 200A into orbital slot OS1. If satellite 20B is already in orbital slot OS1, long range intersatellite communication between satellites 20 and 20B can be established by launching satellite 200 into orbital slot OS.

The foregoing embodiment of the invention allows a satellite system operator to defer the design of equipment for intersatellite communications until the need is confirmed. A spacecraft, such as satellite 20, can be launched and activated and then, through the use of supplemental satellite 200, intersatellite communications can be added. In this way, an orbital slot, such as OS or OS1, can be populated with a core satellite having a productive lifetime which is protected from obsolescence.

The preferred embodiment may be altered and modified without departing from the true spirit and scope of the invention as defined in the accompanying claims. For example, orbital slot OS may involve GEO, LEO, MEO or HEO orbits. The only requirement is that the supplemental satellite 200 can be able to stationkeep in close proximity to core satellite 20 during its normal movements. Link terminals 60 and 220 may comprise various types of intersatellite links, including both radio frequency and laser links along with various multiplexing and modulation techniques that could be used to carry information. The points in the core satellites up-link and down-link signal path at which the signals or information to and from supplemental satellite 200 can be extracted or introduced may be varied and modified from the positions shown and implemented by switches 100 and 110. Those skilled in the art will recognize that intermediate points in the core satellite's original processing flow may be used to extract signals to be sent to supplemental satellite 200. The invention is not limited to the particular points illustrated by the placement of switches 100 and 110.

What is claimed is:

1. In a satellite communication system, a method of enhancing the communication capabilities of said system comprising in combination:

deploying a first satellite into an orbital slot at a first point in time, said first satellite being capable of communicating with a second satellite;

deploying said second satellite at a second point in time later than said first point in time after a need for communication between the first and second satellites has been confirmed, whereby the communication capabilities of said first satellite are expanded to intersatellite capabilities by launching said second satellite after said first satellite is in said orbital slot;

deploying an uplink receiver with said first satellite, said uplink receiver being capable of receiving communication signals from a first ground-based communication station;

deploying a processor with said first satellite, said processor being capable of processing said communication signals from said uplink receiver;

deploying a first two-way intersatellite communication link terminal operable within a first range with said first satellite, said first terminal being capable of communication with a second two-way intersatellite communication link terminal deployable with said second satellite capable of receiving intersatellite signals from beyond said first range;

deploying a downlink transmitter with said first satellite, said downlink transmitter being capable of transmitting signals to a second ground-based communication station; and deploying a switch with said first satellite enabling signals from said uplink receiver to be utilized by said first intersatellite communication link terminal or said first processor and enabling signals from said first intersatellite communication link terminal or said first processor to be utilized by said downlink transmitter; whereby the communication capabilities of said first satellite are expanded to intersatellite capabilities beyond said first range by launching said second satellite after said first satellite is in said orbital slot.

2. A method, as claimed in claim 1, wherein said deploying a switch comprises deploying a switch that initiates switching in response to information in at least one of said communication signals.

3. A method, as claimed in claim 1, wherein said launching said second satellite comprises launching said second satellite into said orbital slot, whereby the communication capability supported at said orbital slot may be enhanced.

4. A method, as claimed in claim 1, wherein said deploying an uplink receiver comprises deploying an antenna and apparatus capable of converting from carrier frequency to intermediate frequency.

5. A method, as claimed in claim 1, wherein said deploying a processor comprises deploying a bent pipe repeater capable of shifting the frequency of said communication signals received by said uplink receiver to a downlink frequency.

6. In a satellite communication system, a method of enhancing the communication capabilities of said system comprising in combination:

deploying a first satellite into an orbital slot at a first point in time, said first satellite being capable of communicating with a second satellite;

deploying said second satellite at a second point in time later than said first point in time after a need for communication between the first and second satellites has been confirmed, whereby the communication capabilities of said first satellite are expanded to intersatellite capabilities by launching said second satellite after said first satellite is in said orbital slot;

deploying an uplink receiver with said first satellite, said uplink receiver capable of receiving communication signals from a first ground-based communication station;

deploying a processor with said first satellite capable of processing said signals from said uplink receiver;

deploying a first two-way intersatellite communication link terminal operable within a first range with said first satellite;

deploying a second two-way intersatellite communication link terminal operable within said first range with said second satellite and capable of communicating with said first communication link terminal;

deploying a third two-way intersatellite communication link terminal operable beyond said first range with said second satellite and coupled to said second intersatellite communication link terminal;

deploying a downlink transmitter with said first satellite capable of transmitting signals to a second ground-based communication station; and deploying a switch with said first satellite enabling signals from said uplink receiver to be utilized by said first intersatellite communication link terminal or said processor and enabling signals from said first intersatellite communication link terminal or said processor to be utilized by said downlink transmitter.

7. A method, as claimed in claim 6, wherein said deploying a switch comprises deploying a switch that initiates switching in response to information in at least one of said communication signals.

8. A method, as claimed in claim 6, wherein said deploying an uplink receiver comprises deploying an antenna and apparatus capable of converting the frequency of said signals received by said uplink receiver from carrier frequency to intermediate frequency.

9. A method, as claimed in claim 6, wherein said deploying a processor comprises deploying a bent pipe repeater capable of shifting the frequency of said signals received by said uplink receiver to a downlink frequency.

10. In a satellite communication system, a method of enhancing the communication capabilities of said system comprising in combination:
    deploying a first satellite into an orbital slot at a first point in time, said first satellite being capable of communicating with a second satellite;
    deploying said second satellite at a second point in time later than said first point in time after a need for communication between the first and second satellites has been confirmed, whereby the communication capabilities of said first satellite are expanded to intersatellite capabilities by launching said second satellite after said first satellite is in said orbital slot;
    deploying uplink receiver means with said first satellite, said uplink receiver means being for receiving communication signals from a first ground-based communication station;
    deploying processor means with said first satellite for processing said signals from said uplink receiver means;
    deploying first two-way intersatellite communication link terminal means operable within a first range with said first satellite for communicating with a second two-way intersatellite communication link terminal deployable with a second satellite capable of receiving intersatellite signals from beyond said first range;
    deploying downlink transmitter means deployable with said first satellite for transmitting signals to a second ground-based communication station; and
    deploying with said first satellite means for enabling signals from said uplink receiver means to be utilized by said first intersatellite communication link terminal means or said first processor means and for enabling signals from said first intersatellite communication link terminal means or said first processor means to be utilized by said downlink transmitter means, whereby the communication capabilities of said first satellite are expanded to intersatellite capabilities beyond said first range by launching said second satellite after said first satellite is in said orbital slot.

11. A method, as claimed in claim 10, wherein said deploying means for enabling comprises deploying means for initiating enabling in response to information in said communication signals.

12. A method, as claimed in claim 10, wherein said deploying said second satellite comprises deploying said second satellite into said orbital slot, whereby the processing supported at said orbital slot may be enhanced.

13. A method, as claimed in claim 10, wherein said deploying uplink receiver means comprises deploying an antenna and means for converting from carrier frequency to intermediate frequency.

14. A method, as claimed in claim 10, wherein said deploying processor means comprises deploying bent pipe repeater means for shifting the frequency of said signals to a downlink frequency.

15. In a satellite communication system, a method of enhancing the communication capabilities of said system comprising in combination:
    deploying a first satellite into an orbital slot at a first point in time, said first satellite being capable of communicating with a second satellite;
    deploying said second satellite at a second point in time later than said first point in time after a need for communication between the first and second satellites has been confirmed, whereby the communication capabilities of said first satellite are expanded to intersatellite capabilities by launching said second satellite after said first satellite is in said orbital slot;
    deploying uplink receiver means with said first satellite, said uplink receiver means being for receiving communication signals from a first ground-based communication station;
    deploying processor means with said first satellite for processing said signals from said uplink receiver means;
    deploying first intersatellite communication link terminal means with said first satellite for transmitting and receiving signals within a first range;
    deploying second intersatellite communication link terminal means with said second satellite for communicating with said first intersatellite communication link terminal means within said first range;
    deploying third intersatellite communication link terminal means with said second satellite and coupled to said second intersatellite communication link terminal means for communicating with a third satellite beyond said first range;
    deploying downlink transmitter means with said first satellite for transmitting said signals to a second ground-based communication station; and
    deploying with said first satellite means for enabling signals from said uplink receiver means to be utilized by said first intersatellite communication link terminal means or said processor means and for enabling signals from said first intersatellite communication link terminal means or from said processor means to be utilized by said downlink transmitter means.

16. A method, as claimed in claim 15, wherein said deploying means for enabling comprises deploying means for initiating enabling in response to information in said communication signals.

17. A method, as claimed in claim 15, wherein said deploying uplink receiver means comprises deploying an antenna and means for converting from carrier frequency to intermediate frequency.

18. A method, as claimed in claim 15, wherein said deploying processor means comprises deploying bent pipe repeater means for shifting the frequency of said signals to a downlink frequency.

* * * * *